US012790428B2

(12) United States Patent
Takashima et al.

(10) Patent No.: US 12,790,428 B2
(45) Date of Patent: Nov. 10, 2026

(54) MONOMER COMPOSITION FOR CONTACT LENS, POLYMER FOR CONTACT LENS, AND CONTACT LENS AND METHOD FOR MANUFACTURING SAME

(71) Applicant: NOF CORPORATION, Tokyo (JP)

(72) Inventors: Shu Takashima, Oita (JP); Yoshiki Tanaka, Oita (JP); Norio Iwakiri, Kawasaki (JP)

(73) Assignee: NOF CORPORATION, Tokyo (JP)

(*) Notice: Subject to any disclaimer, the term of this patent is extended or adjusted under 35 U.S.C. 154(b) by 665 days.

(21) Appl. No.: 18/256,529

(22) PCT Filed: Dec. 9, 2021

(86) PCT No.: PCT/JP2021/045303
§ 371 (c)(1),
(2) Date: Jun. 8, 2023

(87) PCT Pub. No.: WO2022/131120
PCT Pub. Date: Jun. 23, 2022

(65) Prior Publication Data

US 2024/0026052 A1 Jan. 25, 2024

(30) Foreign Application Priority Data

Dec. 16, 2020 (JP) ................................ 2020-208675

(51) Int. Cl.
*C08F 230/08* (2006.01)
*B29D 11/00* (2006.01)
(Continued)

(52) U.S. Cl.
CPC ............ *C08F 230/08* (2013.01); *C08L 43/04* (2013.01); *G02B 1/043* (2013.01); *G02C 7/04* (2013.01); *B29D 11/00038* (2013.01)

(58) Field of Classification Search
CPC ....... C08F 230/08; C08L 43/04; G02B 1/043; G02C 7/04; B29D 11/00038
See application file for complete search history.

(56) References Cited

U.S. PATENT DOCUMENTS

2013/0172574 A1* 7/2013 Ting ...................... G02B 1/043 548/406
2020/0347166 A1 11/2020 Alli et al.

FOREIGN PATENT DOCUMENTS

CN 103467652 A 12/2013
JP 2007-9060 A 1/2007

(Continued)

OTHER PUBLICATIONS

Machine English translation of WO 2020/218220, Takashima et al., Oct. 29, 2020.*

(Continued)

*Primary Examiner* — Patrick D Niland
(74) *Attorney, Agent, or Firm* — Oblon, McClelland, Maier & Neustadt, L.L.P.

(57) ABSTRACT

A monomer composition including (A) a phosphorylcholine group-containing polysiloxane monomer represented by the following formula (1), (B) a siloxanyl group-containing silicone monomer having at least one or more hydroxy groups in a molecule, represented by the following formula (2) or (3), (C) one or more hydrophilic monomers selected from hydroxyethyl (meth)acrylate, hydroxypropyl (meth) acrylate, and hydroxybutyl (meth)acrylate, (D) methacrylic acid, and (E) a hydrophilic monomer other than the component (C), (1)

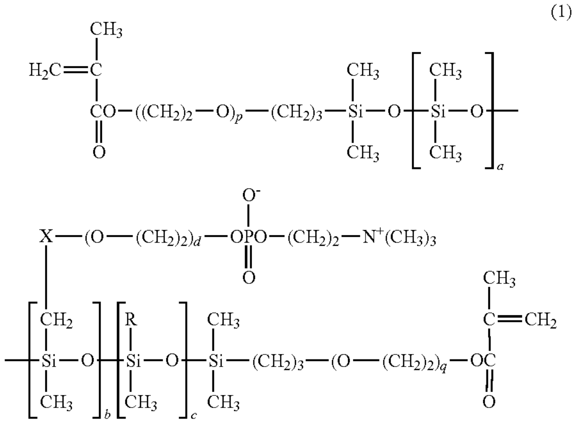

a represents an integer of 20 to 500, b represents an integer of 1 to 70, c represents an integer of 1 to 70, d represents 0 or 1, p and q each represent 0 or 1, X represents $-CH_2-$ or $-CH_2CH_2-$, and R represents an alkyl group having 2 to 18 carbon atoms, (2)

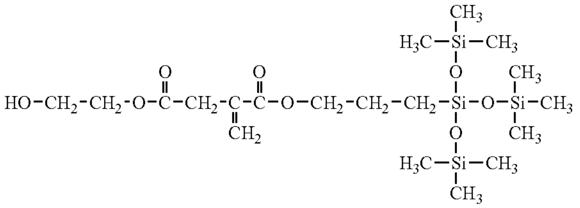

(Continued)

-continued (3)

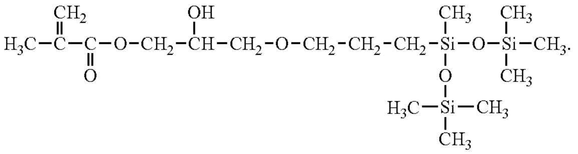

5 Claims, No Drawings

(51) Int. Cl.

| | |
|---|---|
| ***C08L 43/04*** | (2006.01) |
| ***G02B 1/04*** | (2006.01) |
| ***G02C 7/04*** | (2006.01) |

(56) References Cited

FOREIGN PATENT DOCUMENTS

| | | | |
|---|---|---|---|
| JP | 2007-197513 | A | 8/2007 |
| JP | 2014-89477 | A | 5/2014 |
| JP | 5604501 | B2 | 10/2014 |
| TW | 201827892 | A | 8/2018 |
| WO | WO-2010/024372 | A1 | 3/2010 |
| WO | WO 2010/104000 | A1 | 9/2010 |
| WO | WO 2019/194264 | A1 | 10/2019 |
| WO | WO 2020/218220 | A1 | 10/2020 |

OTHER PUBLICATIONS

Li Lin et al., "Surface-hydrophilic and protein-resistant tris(trimethylsiloxy)-3-methacryloxypropyl silane-containing polymer by the introduction of phosphorylcholine groups", Colloids and Surfaces A: Physiochemical And Engineering Aspects, vol. 384, No. 1-3, 2011, pp. 713-719, XP055934792.

Extended European Search Report issued Oct. 31, 2024 in European Patent Application No. 21906483.9, 6 pages.

Xue et al., "Review on structure and biochemical characteristic of phosphatidylcholine analogous polymers" Chemical Industry and Engineering Progress, vol. 9, 2008, 9 pages (with English abstract).

Combined Chinese Office Action and Search Report issued Mar. 1, 2025, in Chinese Patent Application No. 202180083822.9 (with English translation of Office Action only), 9 pages.

Combined Taiwanese Office Action and Search Report issued Mar. 25, 2025 in Taiwanese Patent Application No. 110145985, 9 pages.

International Search Report issued Mar. 1, 2022 in PCT/JP2021/045303 filed on Dec. 9, 2021 2 pages.

* cited by examiner

MONOMER COMPOSITION FOR CONTACT LENS, POLYMER FOR CONTACT LENS, AND CONTACT LENS AND METHOD FOR MANUFACTURING SAME

CROSS REFERENCE TO RELATED APPLICATIONS

This application is a National Stage entry under 35 U.S.C. § 371 of PCT/JP2021/045303, filed on Dec. 9, 2021, and claims priority to Japanese Patent Application No. 2020-208675, filed on Dec. 16, 2020. The entire contents of both are incorporated herein by reference.

TECHNICAL FIELD

The present invention relates to a monomer composition for contact lens, a polymer of the composition, and a contact lens which contains a hydrate of the polymer and a method of producing thereof.

BACKGROUND ART

Silicone hydrogel has low burden on the eyes due to its high oxygen permeability, and is a material that is widely used for ophthalmic lenses such as contact lenses. On the other hand, silicone hydrogel tends to lack wettability and lubricity because it includes hydrophobic silicone. Therefore, a surface hydrophilization by a surface modification method and a surface hydrophilization by mixing a hydrophilic monomer into a lens composition before curing have been investigated. There currently exist various methods to provide silicone hydrogel lens which has optical transparency, desirable lubricity, and high oxygen permeability.

A phosphorylcholine group is known to have excellent properties of exhibiting biocompatibility and extremely high hydrophilicity. And a method to improve hydrophilicity of the lens surface by using a phosphorylcholine group-containing methacrylic ester monomer (MPC) has been proposed. However, a phosphorylcholine group-containing monomer is poor in compatibility with hydrophobic silicone, since it has high hydrophilicity. Therefore, patent literatures 1 to 4 disclose a monomer composition containing a silicone monomer having a hydroxy group and MPC, and it is becoming possible to obtain a silicone hydrogel lens having high surface hydrophilicity.

Furthermore, the use of methacrylic acid has been investigated as a method for improving hydrophilicity of the lens surface. Methacrylic acid is expected to further improve hydrophilicity by incorporating it into a lens, since it has higher hydrophilicity than general hydrophilic monomers. However, methacrylic acid has poor compatibility with the silicone portion in the lens and the water content of the contact lens is prone to change, resulting in stability problems.

CITATION LIST

Patent Literature

PTL 1: JP 2007-009060 A
PTL 2: JP 2007-197513 A
PTL 3: JP 2014-089477 A
PTL 4: WO 2010/104000

SUMMARY OF INVENTION

Technical Problem

The inventors of the present invention had investigated to improve the stability, and as a result, acquired a knowledge that a contact lens produced from a monomer composition containing a phosphorylcholine group-containing polysiloxane monomer of formula (1) as a raw material shows good stability even in the presence of methacrylic acid.

(1)

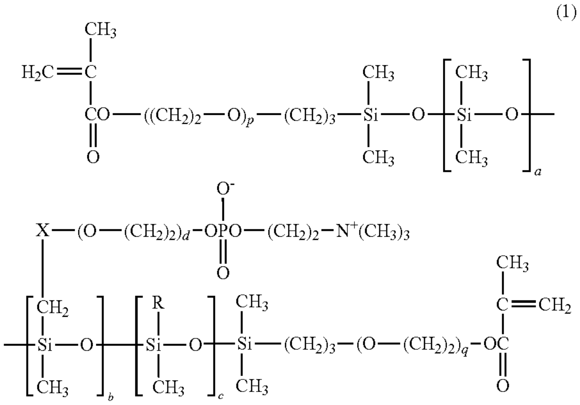

(In the formula, a is an integer of 20 to 500; b is an integer of 1 to 70; c is an integer of 1 to 70; d is 0 or 1; p and q each represents 0 or 1; X is $—CH_2—$ or $—CH_2CH_2—$; and R is an alkyl group having 2 to 18 carbon atoms.)

Currently, a widespread silicone hydrogel contact lens needs to be replaced at regular intervals, and the replacement period may be every other day, every 2 weeks or every 1 month. Since the same lens is worn to use repeatedly for a lens having long replacement period, it is important that the shape of the lens does not change when using repeatedly.

For the shape stability of the contact lens, modulus and elongation at break of the contact lens are significantly related. However, although a contact lens using a polysiloxane monomer has sufficient surface hydrophilicity and is excellent in stability, there has been room for improvement in terms of modulus and elongation at break.

Accordingly, an object of the present invention is to provide a monomer composition for contact lens which contains a phosphorylcholine group-containing polysiloxane monomer described in formula (1), and a monomer composition for contact lens capable of producing a contact lens which exhibits good stability, and has excellent modulus and elongation at break.

Note that "Excellent modulus" means that the modulus is 0.3 MPa or more and 0.8 MPa or less in the mechanical strength measurement described in detail in Examples. And "excellent elongation at break" means that the elongation at break is 200% or more in the mechanical strength measurement described in detail in Examples.

Another object of the present invention is to provide a composition and a polymer that can be suitably used to obtain the above contact lens.

Solution to Problem

As a result of intensive studies to solve the above problems, the inventors have found that the above object can be achieved by a monomer composition which contains a phosphorylcholine group-containing polysiloxane monomer described in formula (1); a specific siloxanyl-group-containing silicone monomer; a hydrophilic monomer selected from hydroxyethyl (meth)acrylate, hydroxypropyl (meth)acrylate, and hydroxybutyl (meth)acrylate; and methacrylic acid, as essential components, and in which these components are contained in specific ranges, and thus, have completed the present invention.

(1)

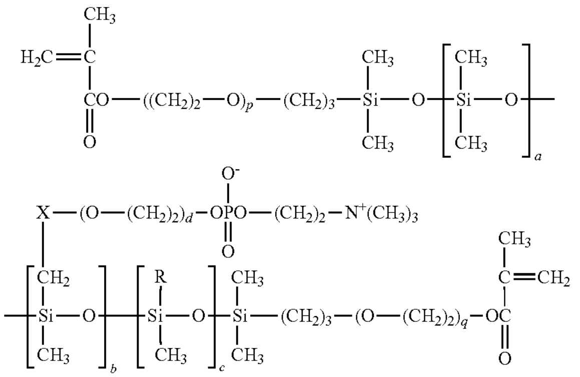

(In the formula, a is an integer of 20 to 500; b is an integer of 1 to 70; c is an integer of 1 to 70; d is 0 or 1; p and q each represents 0 or 1; X is $—CH_2—$ or $—CH_2CH_2—$; and R is an alkyl group having 2 to 18 carbon atoms.)

According to one embodiment of the present invention, a monomer composition for contact lens containing: (A) a phosphorylcholine group-containing polysiloxane monomer represented by the following formula (1); (B) a siloxanyl group-containing silicone monomer having at least one or more hydroxy groups in a molecule, represented by the following formula (2) or (3); (C) one or more hydrophilic monomers selected from hydroxyethyl (meth)acrylate, hydroxypropyl (meth)acrylate, and hydroxybutyl (meth) acrylate; and (D) methacrylic acid, in which, with respect to a total 100 mass % of the components (A) to (E) in the composition, a content ratio of the component (A) is 10 to 45 mass %, a content ratio of the component (B) is 10 to 40 mass %, a content ratio of the component (C) is 10 to 30 mass % and a content ratio of the component (D) is 0.1 to 5 mass %, is provided.

According to one embodiment of the present invention, a monomer composition for contact lens containing: (A) a phosphorylcholine group-containing polysiloxane monomer represented by the following formula (1); (B) a siloxanyl group-containing silicone monomer having at least one or more hydroxy groups in a molecule, represented by the following formula (2) or (3); (C) one or more hydrophilic monomers selected from hydroxyethyl (meth)acrylate, hydroxypropyl (meth)acrylate, and hydroxybutyl (meth) acrylate; (D) methacrylic acid; and (E) a hydrophilic monomer other than the component (C), in which, with respect to a total 100 mass % of the components (A) to (E) in the composition, a content ratio of the component (A) is 10 to 45 mass %, a content ratio of the component (B) is 10 to 40 mass %, a content ratio of the component (C) is 10 to 30 mass %, a content ratio of the component (D) is 0.1 to 5 mass %, and a content ratio of the component (E) is 0 to 50 mass %, is provided.

(1)

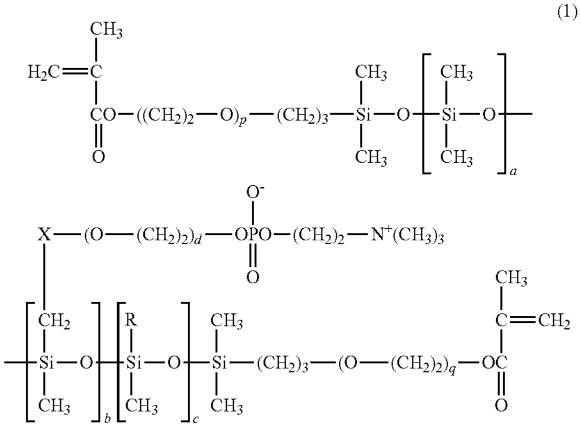

In the formula 1, a represents an integer of 20 to 500; b represents an integer of 1 to 70; c represents an integer of 1 to 70; d represents 0 or 1; p and q each represents 0 or 1; X represents $—CH_2—$ or $—CH_2CH_2—$; and R represents an alkyl group having 2 to 18 carbon atoms.

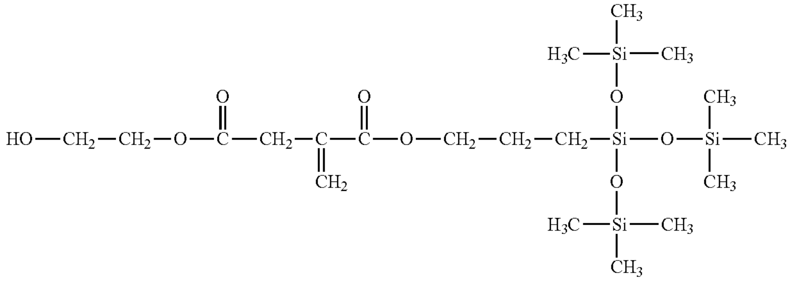

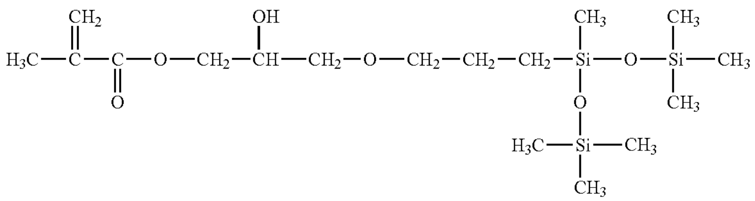

According to another embodiment of the present invention, a polymer for contact lens which contains a polymer of the monomer composition for contact lens is provided.

According to still another embodiment of the present invention, a contact lens which contains a hydrate of the polymer for contact lens, and a method of producing thereof are provided.

Specifically, the present invention is as follows.

1. A monomer composition for contact lens containing: (A) a phosphorylcholine group-containing polysiloxane monomer represented by the following formula (1); (B) a siloxanyl group-containing silicone monomer having at least one or more hydroxy groups in a molecule, represented by the following formula (2) or (3); (C) one or more hydrophilic monomers selected from hydroxyethyl (meth)acrylate, hydroxypropyl (meth)acrylate, and hydroxybutyl (meth)acrylate; (D) methacrylic acid; and (E) a hydrophilic monomer other than the component (C), in which with respect to a total 100 mass % of the components (A) to (E) in the composition, a content ratio of the component (A) is 10 to 45 mass %, a content ratio of the component (B) is 10 to 40 mass %, a content ratio of the component (C) is 10 to 30 mass %, a content ratio of the component (D) is 0.1 to 5 mass %, and a content ratio of the component (E) is 0 to 50 mass %.

(1)

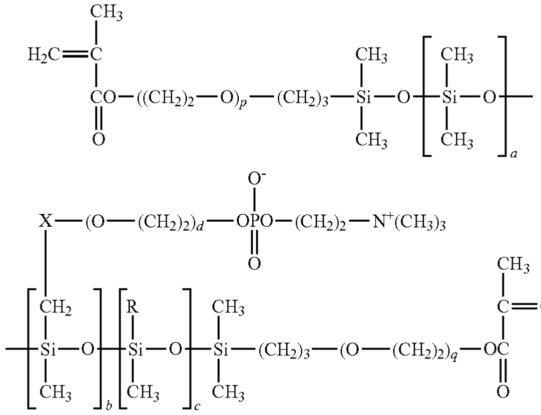

In the formula 1, a represents an integer of 20 to 500; b represents an integer of 1 to 70; c represents an integer of 1 to 70; d represents 0 or 1; p and q each represents 0 or 1; X represents $-CH_2-$ or $-CH_2CH_2-$; and R represents an alkyl group having 2 to 18 carbon atoms.

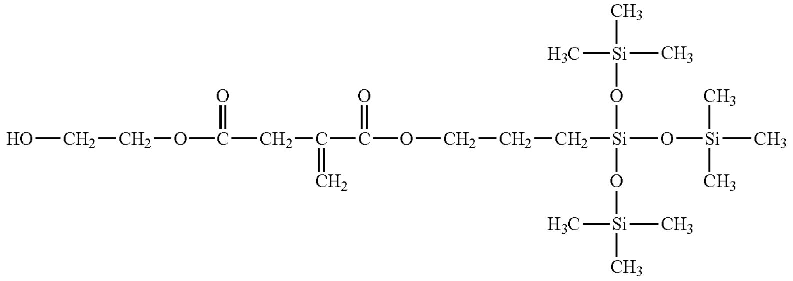

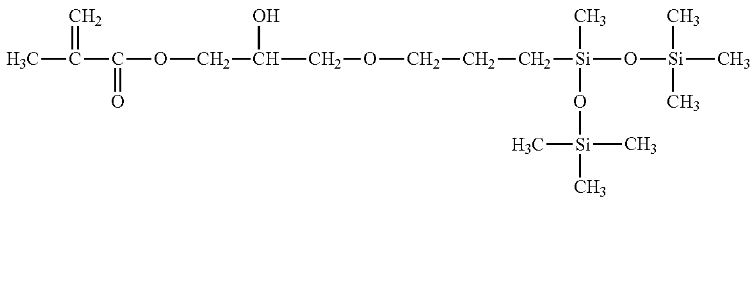

2. The monomer composition for contact lens according to the above 1, which further containing (F) a solvent having a hydroxy group, in which with respect to a total 100 parts by mass of the components (A) to (E) in the composition, a content ratio of the component (F) is 30 parts by mass or less.
3. A polymer for contact lens containing a polymer of the monomer composition for contact lens according to the above 1 or 2.
4. A contact lens containing a hydrate of the polymer for contact lens according to the above 3.
5. The contact lens according to the above 4, in which a modulus of the contact lens is within the range of 0.3 MPa or more and 0.8 MPa or less.
6. The contact lens according to the above 4, in which an elongation at break is 200% or more.
7. A method of producing a contact lens containing: a step (1) of mixing the polymer for contact lens according to the above 3 with one or more solvents selected from water, methanol, ethanol, 1-propanol, and 2-propanol, and washing the polymer; and a step (2) of hydrating the polymer by immersing in physiological saline.

Advantageous Effects of Invention

A contact lens of the present invention can exhibit excellent modulus, elongation at break and stability at the same time since it is produced by using a monomer composition for contact lens of the present invention.

DESCRIPTION OF EMBODIMENTS

A monomer composition for contact lens of the present invention contains components (A) to (D) described below in detail as essential monomer components, may also contains a component (E) as an optional monomer component, and may further contains a component (F) as an optional solvent component.

A polymer for contact lens of the present invention can be obtained from a polymer of a monomer composition for contact lens of the present invention. And a contact lens of the present invention can be obtained from a polymer for contact lens of the present invention. In addition, a contact lens of the present invention may be a hydrate of the polymer for contact lens of the present invention. Hereinafter, a monomer composition for contact lens of the present invention is simply referred to as "the composition". Moreover, a polymer for contact lens of the present invention is simply referred to as "the polymer".

Note that "excellent modulus" in the present invention means that the numeric value is not particularly limited, but preferably means the one having the modulus of 0.3 MPa or more and 0.8 MPa or less in the mechanical strength measurement described in detail in the examples. Further, "excellent elongation at break" means that the numeric value is not particularly limited, but preferably means the one having the elongation at break is 200% or more in the mechanical strength measurement described in detail in Examples.

The component (A) is a phosphorylcholine group-containing polysiloxane monomer represented by formula (1). The component (A) is a component that contributes to improving the stability and the surface hydrophilicity of the manufactured contact lens. The phosphorylcholine group-containing polysiloxane monomer of the present invention preferably has a number average molecular weight of 2,000 to 50,000.

(1)

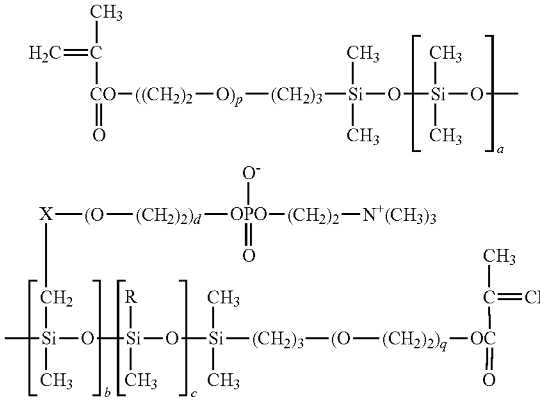

In the formula 1, a is an integer of 20 to 500; b is an integer of 1 to 70; c is an integer of 1 to 70; d is 0 or 1; p and q each represents 0 or 1; X is $—CH_2—$ or $—CH_2CH_2—$; and R is an alkyl group having 2 to 18 carbon atoms.

Although a, b and c are not particularly limited as long as they are within the above ranges, a is 20 to 500, preferably 20 to 300, more preferably 20 to 200, still more preferably 25 to 170, and particularly preferably 30 to 120; b is 1 to 70, preferably 1 to 40, more preferably 1 to 20, still more preferably 1 to 10, particularly preferably 1 to 3; c is 1 to 70, preferably 1 to 40, more preferably 1 to 20, still more preferably 1 to 10, and particularly preferably 1 to 5. R represents an alkyl group having 2 to 18 carbon atoms and includes linear and branched structures ($R═C_nH_m$: n=2 to 18, m=2n+1), preferably 3 to 12 carbon atoms, and more preferably 3 to 8 carbon atoms. For example, it represents a propyl group, a butyl group, a pentyl group, an isopentyl group, a hexyl group, an isohexyl group, an octyl group and the like.

In the composition of the present invention, when a total of the components (A) to (E) is 100% by mass, a content ratio of the component (A) is 10 to 45% by mass, preferably 15 to 35% by mass. When the content ratio is less than 10% by mass, the transparency of the polymer deteriorates, and when it exceeds 45% by mass, the surface hydrophilicity of the polymer deteriorates.

The phosphorylcholine group-containing polysiloxane monomer represented by formula (1), which is the component (A), can be synthesized by various methods and is not particularly limited. The following methods are given as examples.

A silicone intermediate represented by formula (4) used for synthesizing the phosphorylcholine group-containing polysiloxane monomer of the present invention can be synthesized by known methods.

Both-terminal hydroxy group-containing siloxane represented by the formula (4) {for example, SIB1138.0 by Gelest, Inc. (in the formula (4), p=q=1, n=0)}, terminal hydroxy group-containing disiloxane such as SIB1145.0 (in the formula (4), p=q=n=0), both-terminal hydroxy group-containing silicone such as FM-4411 by JNC Corp. (in the formula (4), p=q=1, n=9), or likes is reacted with methacrylic acid chloride in the presence of a dehydrochlorination agent to synthesize a both-terminal methacrylic group-containing compound represented by formula (5). As the dehydrochlorination agent, organic amines can be used. Trialkylamines such as triethylamine; dialkylamines such as diisopropylamine; and organic amines such as diazabicycloundecene are preferably used. An aprotic solvent can be used during the reaction. Tetrahydrofuran is preferred from the perspective of solubility.

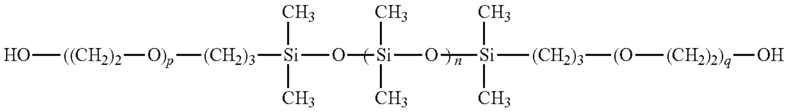

In the formula, p and q each represents 0 or 1; and n is an integer of 0 to 10.

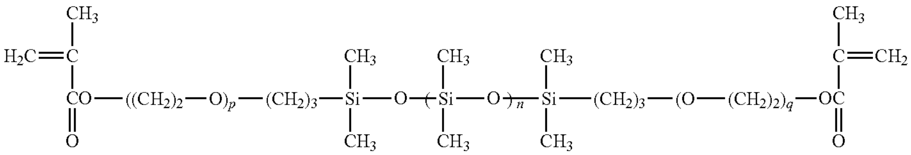

In the formula, p and q each represents 0 or 1; and n is an integer of 0 to 10.

The compound represented by the formula (5) can be purchased from, for example, FM-7711 by JNC Corp., (p=q=0, n=9); DMS-R11 by Gelest, Inc., (p=q=0, n=9); and X22-164AS by Shin-Etsu Chemical Co., Ltd., (p=q=0, n=9) and the like.

In addition, alkyl group-containing cyclic silicone represented by formula (6) used for synthesizing the phosphorylcholine group-containing polysiloxane monomer of the present invention can be synthesized by known methods. In the formula (6), R is an alkyl group having 2 to 18 carbon atoms and includes a linear or branched structure ($R{=}C_nH_m$: n=2 to 18 m=2n+1). As examples of R, ethyl group, propyl group, butyl group, pentyl group, isopentyl group, hexyl group, isohexyl group, and octyl group are given.

Alkyl group-containing cyclic silicone represented by the formula (6) can be synthesized by a hydrosilylation reaction which is an addition reaction of 1,3,5,7-tetramethylcyclotetrasiloxane and various alkenes having 2 to 18 carbon atoms (for example, ethylene, propylene, butylene, pentylene, hexylene, 2-methylpentylene). If necessary, it is possible to remove the catalyst used in the reaction by adsorption treatments or liquid separations, and to remove unreacted components by a reduced pressure.

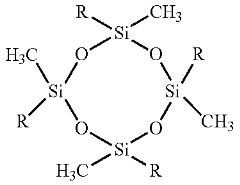

Next, a hydrosilyl group-containing silicone intermediate represented by formula (7) (both-terminal methacrylic silicone containing a hydrosilyl group) is obtained by reacting both-terminal methacrylic group-containing compound represented by the formula (5), octamethylcyclotetrasiloxane, 1,3,5,7-tetramethylcyclotetrasiloxane, and alkyl group-containing cyclic silicone represented by the formula (6), using acid catalysts such as trifluoromethanesulfonic acid. At this time, no solvent may be used, or solvents such as chloroform may be used.

(7)

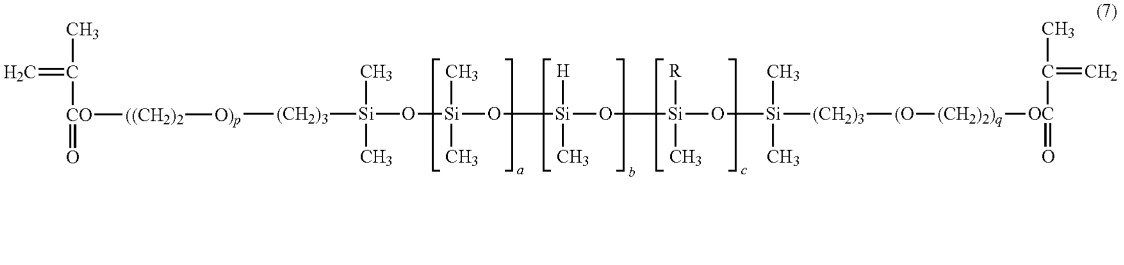

(In the formula, a is an integer of 20 to 500; b is an integer of 1 to 70; c is an integer of 1 to 70; p and q each represents 0 or 1; and R is an alkyl group having 2 to 18 carbon atoms.)

Although a and b are not particularly limited as long as they are within the above ranges, a is 20 to 500, preferably 50 to 300, more preferably 70 to 200; b is 1 to 70, preferably 2 to 40, more preferably 3 to 15; and c is 1 to 70, preferably 2 to 40, more preferably 3 to 15.

The acid catalyst after the reaction is removed by known methods. For example, it can be removed by washing with water or an adsorption with sodium bicarbonate and the like.

Further, the phosphorylcholine group-containing polysiloxane monomer of the formula (1) can be obtained by subjecting both-terminal methacrylic group-containing silicone containing a hydrosilyl group represented by formula (7) and a phosphorylcholine compound represented by formula (9) to a hydrosilylation, which is an addition reaction, and removing an excess amount of the compound of the formula (9) using solvents and the like, and removing low boiling-point components under reduced pressure.

And, the compound of formula (9) can be obtained by reacting an alcohol represented by formula (8) with 2-chloro-2-oxo-1,3,2-dioxaphospholane (COP) in aprotic solvents such as acetonitrile, and then reacting with trimethylamine in an aprotic solvent such as acetonitrile.

$$Z\!-\!\left[O-(CH_2)_2\right]_d\!-OH$$

In the formula, d is 0 or 1, Z is $CH_2{=}CHCH_2$— or $CH_2{=}CH$—.

(9)

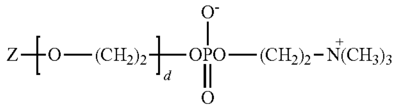

In the formula, d is 0 or 1, Z is $CH_2{=}CHCH_2$— or $CH_2{=}CH$—.

The component (B) is a siloxanyl group-containing silicone monomer having at least one hydroxy group in the molecule represented by formula (2) or (3). These hydroxy group-containing siloxanyl group-containing monomers can be suitably used as raw materials for ophthalmic devices.

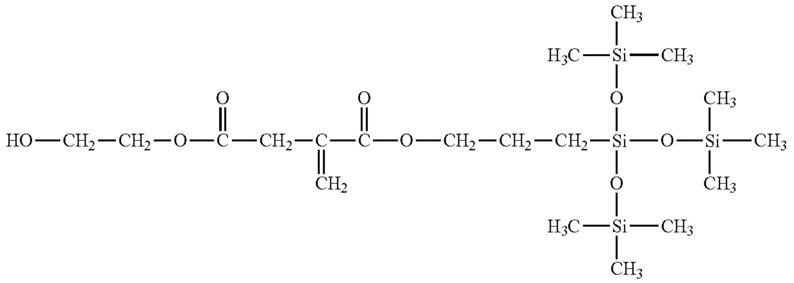

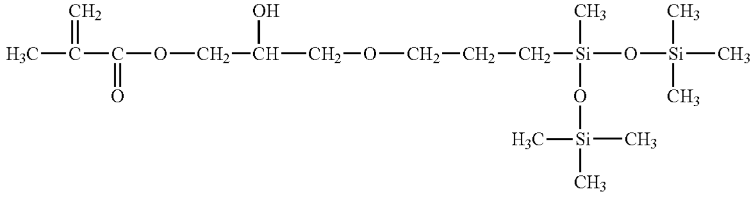

In the composition of the present invention, when a total of the components (A) to (E) is 100% by mass, a content ratio of the component (B) is 10 to 40% by mass, preferably 20 to 35% by mass. When the content ratio of the component (B) is less than 10% by mass, the transparency of the produced polymer for contact lens deteriorates. On the other hand, when it exceeds 40% by mass, there is a concern that the surface hydrophilicity of the contact lens deteriorates.

The component (C) is one or more hydrophilic monomers selected from hydroxyethyl (meth)acrylate, hydroxypropyl (meth)acrylate, and hydroxybutyl (meth)acrylate.

The component (C) is a component that contributes to improving the modulus of the manufactured contact lens.

As the component (C), specifically, 2-hydroxyethyl (meth)acrylate, 2-hydroxypropyl (meth)acrylate, 4-hydroxybutyl (meth)acrylate, and 2-hydroxybutyl (meth)acrylate are given as examples.

In the present invention, "(meth)acrylate" means "acrylate and/or methacrylate", and "(meth)acrylic" means "acrylic and/or methacrylic".

In the composition of the present invention, when a total of the components (A) to (E) is 100% by mass, a content ratio of the component (C) is 10 to 30% by mass, preferably 15 to 25% by mass. When the content ratio of the component (C) is less than 10% by mass, elongation at break is insufficient. On the other hand, when it exceeds 30% by mass, the modulus becomes too high, and the wearing feeling may deteriorate in some cases.

The component (D) is methacrylic acid. The component (D) is a component that facilitates to improve surface hydrophilicity of the manufactured contact lens.

In the composition of the present invention, when a total of the components (A) to (E) is 100% by mass, a content ratio of the component (D) is 0.1 to 5% by mass, preferably 0.2 to 2% by mass. When the content ratio of the component (D) is less than 0.1% by mass, the effect of improving hydrophilicity of the manufactured contact lens cannot be sufficiently obtained. On the other hand, when it exceeds 5% by mass, the stability of the contact lens deteriorates.

The component (E) is a hydrophilic monomer other than the component (C). The component (E) is an optional component and can be blended for the purpose such as adjusting a water content in contact lens.

As the component (E), alkyl (meth)acrylate in which the alkyl group having 1 to 4 carbon atoms, and monomers having a hydrophilic group and the like are given as examples. Here, the monomer having a hydrophilic group is a compound having at least one group selected from hydroxy group, amino group, amide group, carboxy group, ether group, and phosphorylcholine group, and also having a polymerizable unsaturated groups such as vinyl group and a (meth)acryloyl group.

As specific examples of the component (E), alkyl methacrylates such as 2-methacryloyloxyethyl succinic acid, 2-methacryloyloxyethylphosphorylcholine (MPC), methyl (meth)acrylate, ethyl (meth)acrylate and butyl (meth)acrylate, methoxypolyethylene glycol methacrylates, and amide group-containing monomers such as N-vinylpyrrolidone, N,N-dimethylacrylamide, N,N-diethylacrylamide, N-vinyl-N-methylacetamide and N-vinylacetamide, are given. Among these, the component (E) is preferably one or more selected from the group consisting of 2-methacryloyloxyethylphosphorylcholine (MPC), methyl (meth)acrylate, N-vinylpyrrolidone, and N,N-dimethylacrylamide.

The component (E) may be one of these monomers or a mixture of two or more of them.

When containing the component (E), with respect to the total amount of all monomer components in the composition of the present invention, the content ratio is 50% by mass or less, and may be 0 to 50% by mass, 0.01 to 50% by mass, 0.1 to 50% by mass, 1 to 50% by mass, or 10 to 50% by mass. When it is 50% by mass or less, the effects of the present invention can be obtained in a well-balanced manner. The component (F) is a solvent having a hydroxy group. As the component (F), carboxylic acids and alcohols are given as examples. The component (F) can be blended for the purpose of stabilizing the modulus and the shape of the contact lens. As specific examples of the component (F), methanol, ethanol, 1-propanol, 2-propanol, 1-butanol, 2-butanol, tert-butanol, 1-pentanol, 2-pentanol, tert-amyl alcohol, 1-hexanol, 1-octanol, 1-decanol, 1-dodecanol, glycolic acid, lactic acid, acetic acid and the like are given. The component (F) may be any one of these solvents or a mixture of two or more of them. In terms of availability and pH stability, the component (F) is preferably one or more selected from ethanol, 1-propanol, 2-propanol and 1-hexanol.

When the composition of the present invention contains the component (F), when a total of the components (A) to (E) in the composition is 100 parts by mass, a content ratio of the component (F) is 30 parts by mass or less, preferably 20 parts by mass or less. When it is 30 parts by mass or less, the modulus and the shape of the contact lens can be retained in a well-balanced manner.

The composition of the present invention may contain a cross-linking agent in addition to the above components (A) to (F). As examples, ethylene glycol dimethacrylate, tetraethylene glycol dimethacrylate, triethylene glycol divinyl ether and the like, are given. Although the cross-linking agent may be any one of them or two or more of them, it is preferable to use a combination of two or more of the cross-linking agents.

When the composition of the present invention contains the cross-linking agent, when a total of the components (A) to (E) in the composition is 100 parts by mass, a content ratio of the cross-linking agent is 10 parts by mass or less, preferably 5 parts by mass.

The composition of the present invention may contain a polymerization initiator in addition to the above components (A) to (F) and the cross-linking agent. The polymerization initiator may be known ones, preferably a thermal polymerization initiator. When a thermal polymerization initiator is used, it facilitates the changes in copolymerisability of each monomer component due to the temperature changes during the polymerisation.

As examples of the thermal initiators, azo polymerization initiators such as 2,2'-azobisisobutyronitrile, dimethyl 2,2-azobis(2-methylpropionate), 2,2'-azobis[2-(2-imidazoline-2-yl)propane]dihydrochloride, 2,2'-azobis(2,4-dimethylvaleronitrile), 2,2'-azobis[2-(2-imidazolin-2-yl)propane] disulfatedihydride, 2,2'-azobis(2-methylpropionamidine) dihydrochloride, 2,2'-azobis[N-(2-carboxyethyl)-2-methylpropionamidine]dihydrate, 2,2'-azobis[2-(2-imidazolin-2-yl)propane], 2,2'-azobis(1-imino-1-pyrrolidino-2-methylpropane)dihydrochloride, 2,2'-azobis [2-methyl-N-{1,1-bis(hydroxymethyl)-2-hydroxyethyl}propionamide], 2,2'-azobis[2-methyl-N-(2-hydroxyethyl)propionamide], 2,2'-azobis(2-methylpropionamidine)dihydrochloride, and 2,2'-azobis[2-methyl-N-(2-hydroxyethyl)propionamide], and peroxide polymerization initiators such as benzoyl peroxide, t-butyl hydroperoxide, cumene hydroperoxide, lauroyl peroxide, t-butyl peroxyhexanoate, and 3,5,5-trimethylhexanoyl peroxide, are given. These polymerization initiators may be used alone or in combination of two or more, Among these, azo polymerization initiators are preferable in terms of safety and availability, and 2,2'-azobisisobutyronitrile, dimethyl 2,2-azobis(2-methylpropionate), and 2,2'-azobis(2,4-dimethylvaleronitrile) are particularly preferable in terms of the reactivity.

When the composition of the present invention contains the polymerization initiator, when a total of the components (A) to (E) in the composition is 100 parts by mass, a content ratio of the polymerization initiator is 0.1 to 3 parts by mass, preferably 0.1 to 2 parts by mass, more preferably 0.2 to 1 part by mass. When it is in a range of 0.1 to 3 parts by mass, the polymer of the monomer composition of the present invention can be easily obtained.

The composition of the present invention may contain additives such as a polymerizable ultraviolet absorber, and a polymerizable dye (colorant), in addition to the above components (A) to (F), the cross-linking agent, and the polymerization initiator, to the extent that it does not interfere with the object of the invention. By blending the ultraviolet absorber, it is possible to reduce the burden on eyes due to ultraviolet rays such as sunlight. In addition, by blending the dye, colored contact lens can be obtained.

Although a used amount of these additives depends on the thickness of the contact lens and the like, but usually, when the total of components (A) to (E) is 100 parts by mass, each content ratio of the polymerizable ultraviolet absorber and the polymerizable dye is preferably 5 parts by mass or less, more preferably 0.02 to 3 parts by mass.

A method of producing the composition of the present invention is not particularly limited. For example, it can be produced by putting each component into a stirring (mixing) device in any order or all at once, and stirring (mixing) at a temperature of 10° C. to 50° C. until it becomes uniform. However, when the composition contains the polymerization initiator, it should be noted not to initiate the polymerization reaction during mixing, and it is preferable to mix at 40° C. or less.

The polymer of the present invention contains the polymer of the composition of the present invention described above. The method of producing the polymer of the present invention will be described below. The below method of producing is only one embodiment of the method for obtaining the polymer, and the polymer of the present invention is not limited to what is obtained by the method of producing.

The polymer of the present invention can be produced by filling a mold with the composition of the present invention and performing a polymerization reaction. As the mold, a mold having a hydrophobic surface made of polypropylene and the like may be used.

The polymerization reaction can be performed by a polymerization step of one stage or a polymerization step of two or more stages. The polymerization reaction may be performed, for example, by a polymerization step of one stage in which the composition is maintained at a temperature of 45° C. to 140° C. for 1 hour or more depending on the decomposition temperature of the polymerization initiator used. However, it is preferable to be performed by a polymerization step of one stage including the polymerization step 2, or a polymerization step of two or more stages including the polymerization step 1 and the polymerization step 2, which will be described below. After the completion of polymerization, the polymer may be removed from the mold after cooling to, for example, 60° C. or less.

(Polymerization Step 1)

In the polymerization step 1, the above polymerization initiator is added to the composition as necessary, and polymerization is performed at a temperature of 45° C. to 140° C. for 1 hour or more.

The polymerization temperature in the polymerization step 1 is preferably 50° C. to 70° C., more preferably 55° C. to 70° C. When the polymerization temperature in the polymerization step 1 is 45° C. to 75° C., the polymer having good physical properties can be stably obtained.

The polymerization time in the polymerization step 1 is preferably 2 hours or more and 12 hours or less. When the polymerization time in the polymerization step 1 is 1 to 12 hours, the polymer having good physical properties such as modulus can be efficiently obtained.

(Polymerization Step 2)

The polymerization step 2 is a step of performing a polymerization reaction at 90° C. to 140° C. When the polymerization step 1 is not performed, the polymerization step 2 is performed by adding the above polymerization initiator to the composition as necessary.

The polymerization temperature in the polymerization step 2 is preferably 100° C. to 120° C. When the polymerization temperature in the polymerization step 2 is 90° C. to 140° C., a polymer having good physical properties such as modulus can be stably obtained, and the polymer can be efficiently obtained without deforming the mold made of polypropylene or the like.

The polymerization time in the polymerization step 2 is preferably 1 hour or more and 10 hours or less. When the polymerization time in the polymerization step 2 is 1 to 10 hours, the polymer having good physical properties such as modulus can be efficiently obtained.

The atmosphere in which the polymerization steps 1 and 2 are performed is not particularly limited, but both the polymerization steps 1 and 2 are preferably performed in an inert gas atmosphere such as nitrogen or argon from the viewpoint of improving the polymerization ratio. In this case, the inert gas may be passed through the composition, or where the composition is filled in the mold may be set in the inert gas atmosphere.

The pressure inside the mold may be under atmospheric pressure to slight pressure. When the polymerization is performed in the inert gas atmosphere, a gauge pressure is preferably 1 $kgf/cm^2$ or less.

The contact lens of the present invention may be a silicone hydrogel contact lens containing a hydrate of the above polymer. That is, the contact lens of the present invention can be obtained by hydrating the polymer of the present invention and making it water-contained to be a hydrogel shape. Note that "silicone hydrogel" in the description means hydrogel having a silicone portion in the polymer. Since the composition of the present invention contains the components (A) and (B), which are silicone-containing monomers, the polymer has the silicone portion and can form silicone hydrogel by hydration (water-containing).

The water content of the contact lens (the ratio of water to the total mass of the contact lens) is 35% by mass or more and 60% by mass or less, preferably 35% by mass or more and 50% by mass or less. When the water content is 35 to 60% by mass, it can be good balanced with other lens physical properties.

Next, a method of producing the contact lens of the present invention will be described. The method of producing described below is only one embodiment of the method for obtaining the contact lens of the present invention, and a contact lens of the present invention is not limited to what is obtained by the method of producing.

After the above polymerization reaction, the polymer may be in a state of a mixture of unreacted monomer components (unreacted products), residues of each component, by-products, residual solvents and the like, in some cases. Although it is possible to subject such a mixture to the hydration treatment as it is, it is preferable to purify the polymer using a purification solvent before the hydration treatment.

From this perspective, the method of producing a contact lens of the present invention preferably contains: a step (1) of mixing the polymer for contact lens with one or more solvents selected from water, methanol, ethanol, 1-propanol, and 2-propanol, and washing the polymer; and a step (2) of hydrating the polymer by immersing in physiological saline.

The step (1) is a step of purifying the polymer, and as the used solvent, water, methanol, ethanol, 1-propanol, 2-propanol, mixtures thereof and the like, are given as examples. The purification can be performed, for example, by immersing the polymer in an alcoholic solvent for 10 minutes to 5 hours at a temperature of 10° C. to 40° C., followed by immersing it in water for 10 minutes to 5 hours, and the like. In addition, after being immersed in the alcohol solvent, it may be immersed in hydrous alcohol having an alcohol concentration of 20 to 50% by weight for 10 minutes to 5 hours, and then immersed in water. As water, pure water, ion-exchanged water and the like are preferable.

In the step (2), the contact lens of the present invention can be obtained by immersing the polymer washed in the step (1) in physiological saline and hydrating it to a predetermined water content. The physiological saline may be borate buffered physiological saline, phosphate buffered physiological saline and the like. In addition, it may be immersed in a soft contact lens storage solution containing physiological saline. The osmotic pressure of the physiological saline is preferably 250 to 400 mOms/kg from the viewpoint of hydration.

Since the contact lens of the present invention has suitable surface hydrophilicity and excellent stability, it can be used for about one month in a normal form of use. That is, the replacement frequency of the contact lens of the present invention may be maximum period of one month. Naturally, it may be replaced in a shorter period.

EXAMPLES

The present invention will be described in more detail below with reference to Examples and Comparative Examples, however the present invention is not limited to them. First, the components used in Examples and Comparative Examples are shown below.

Component (A)

A-1 to A-4 in the table below, which are the compounds represented by the formula (1), were used.

TABLE 1

| | A-1 | A-2 | A-3 | A-4 |
|---|---|---|---|---|
| Formula (1) a | 73 | 70 | 71 | 152 |
| Formula (1) b | 2 | 2 | 2 | 4 |
| Formula (1) c | 4 | 4 | 4 | 8 |
| Structure: R | propyl | hexyl | isohexyl | isohexyl |
| Formula (1) d | 1 | 1 | 1 | 1 |
| Formula (1) p | 0 | 0 | 0 | 0 |
| Formula (1) q | 0 | 0 | 0 | 0 |
| Formula (1) X | $-CH_2CH_2-$ | $-CH_2CH_2-$ | $-CH_2CH_2-$ | $-CH_2CH_2-$ |
| Number average molecular weight | 4400 | 4600 | 5000 | 10100 |

Component (B)

ETS, which is a compound represented by the formula (2), and SIGMA, which is a compound represented by the formula (3), were used.

ETS: 4-(2-hydroxyethyl)-1-[3-tris(trimethylsiloxy)silylpropyl]=2-methylidenesuccinate SIGMA: 2-hydroxy-3-[bis(trimethylsiloxy)methylsilyl] propyl methacrylate Component (C)

HEMA: 2-hydroxyethyl methacrylate

HPMA: 2-hydroxypropyl methacrylate

HBMA: 2-hydroxybutyl methacrylate

Component (D)

MAA: methacrylic acid

Component (E)

MPC: 2-(methacryloyloxyethyl)-2-(trimethylammonioethyl) phosphate

MMA: methyl methacrylate

NVP: N-vinylpyrrolidone

DMAA: N,N-dimethylacrylamide

Component (F)

HeOH: 1-hexanol

Cross-Linking Agent

TEGDV: triethylene glycol divinyl ether

TEGDMA: Tetraethylene glycol dimethacrylate

Polymerization Initiator

AIBN: 2,2'-azobis(isobutyronitrile)

The following items were evaluated for the compositions, polymers, and contact lenses of Examples and Comparative Examples.

[Modulus of Contact Lens]

Using a breaking strength analysis device BAS-3305 (W) manufactured by Yamaden Co., Ltd., a modulus [MPa] of the contact lens was measured according to JIS-K7127. Specifically, the modulus was measured by using a sample with a width of 2 mm, using a load cell of 200 gf, and pulling at a rate of 1 mm/sec with a clamp distance of 6 mm. When the modulus is 0.3 MPa or more and less than 0.4 MPa or more than 0.6 MPa and 0.8 MPa or less, the modulus was evaluated as good (B), and when it is 0.4 MPa or more and 0.6 MPa or less, the modulus was evaluated as sufficiently good (A).

(Evaluation Criteria)

Modulus [MPa]

A: 0.4 or more and 0.6 or less

B: 0.3 or more and less than 0.4, or more than 0.6 and 0.8 or less

C: less than 0.3, or more than 0.8

[Elongation at Break of Contact Lens]

Using a breaking strength analysis device BAS-3305 (W) manufactured by Yamaden Co., Ltd., an elongation at break [%] of the contact lens was measured according to JIS-K7127. Specifically, the elongation at break was measured by using a sample with a width of 2 mm, using a load cell of 200 gf, and pulling at a rate of 1 mm/sec with a clamp distance of 6 mm. When the elongation at break is 200% or more and less than 300%, the elongation at break was evaluated as good (B), and when the elongation at break is 300% or more, the elongation at break was evaluated as sufficiently good (A).

(Evaluation Criteria)

Elongation at Break [%]

A: 300 or more

B: 200 or more and less than 300

C: less than 200

[Water Content of Contact Lens]

A water content was measured by the method described in ISO-18369-4.

[Stability of Contact Lenses]

A film-shaped sample immersed in the physiological saline described in ISO-18369-3 was stored in a constant temperature bath at 60° C., and after one month passed, the water content was measured as described above, and evaluated by comparison with the initial value. When a change in water content is ±1% or less, the stability was evaluated as sufficiently good (A), and when it is ±1 to 2% or less, the stability was evaluated as good (B).

Example 1

Under the temperature condition of 25° C., 12.5% by mass of A-1, 32.4% by mass of ETS, 13.8% by mass of HBMA, 0.9% by mass of MAA, 9.0% by mass of MPC, 13.5% by mass of NVP, and 17.9% by mass of MMA, and with respect to a total 100 parts by mass of these, 20.0 parts by mass of HeOH, 0.8 parts by mass of TEGDV, and 0.8 parts by mass of TEGDMA were mixed, and were uniformly dissolved to obtain a composition. The content ratios of each component are shown in Table 2.

0.5 parts by mass of AIBN was added to the above composition, was poured into a cell in which a 0.1 mm thickness of polyethylene terephthalate sheet was sandwiched as a spacer between two polypropylene plates, and was placed in an oven. After the nitrogen replacement of inside the oven, the temperature was raised to 100° C. and maintained for 2 hours, and the composition was polymerized at 0 kgf/cm$^2$ (gauge pressure) to obtain a polymer of Example 1. The polymer was removed from the cell.

Physiological saline was prepared with reference to the literature (ISO 18369-3:2006, Ophthalmic Optics-Contact Lenses Part 3; Measurement Methods). 8.3 g of sodium chloride, 5.993 g of sodium hydrogen phosphate dodecahydrate, and 0.528 g of sodium dihydrogen phosphate dihydrate were weighed and dissolved in water to make 1000 mL, and filtered to obtain physiological saline.

After the above polymer was immersed in 2-propanol for 4 hours, followed by immersing in ion-exchanged water for 4 hours, and further immersing in the physiological saline described in ISO 18369-3 to prepare a hydrate of the polymer. This hydrate was processed into a shape suitable for each evaluation test to obtain a contact lens sample. The results of each evaluation are shown in Table 2. Since the modulus was 0.5 MPa, the elongation at break was 260%, and the stability was good, it was confirmed that the contact lens of Example 1 has good modulus and elongation at break, and excellent stability.

Examples 2 to 16, and Comparative Examples 1 and 2

Contact lenses of Examples 2 to 16 were obtained in the same manner as in Example 1 except that the compositions were in accordance with those shown in Tables 2 and 3. The results of the evaluation of modulus, elongation at break, water content and stability in the same manner as in Example 1 are shown in Table 2 and 3. All of them exhibited good modulus in the range of 0.3 MPa or more and 0.8 MPa or less. Moreover, all of them exhibited sufficient elongation at break of 200% or more. Furthermore, the change in water content was within 2% and it was confirmed that the composition has stability.

On the other hand, contact lens of Comparative Examples 1 and 2 were obtained in the same manner as in Example 1 except that the compositions were in accordance with those shown in Table 4. In Comparative Example 1, since the component (C) was not contained, the elongation at break was less than 200%, and the elongation at break was poor and unsuitable as a contact lens.

In Comparative Example 2, since the content ratio of the component (C) was out of the range, the modulus had greater value than 0.8 MPa, and the modulus was unsuitable as a contact lens.

Therefore, it was confirmed that the polymer obtained by polymerizing the monomer composition of the present invention can produce a contact lens having good modulus, elongation at break and stability.

TABLE 2

| | | | | Example 1 | Example 2 | Example 3 | Example 4 | Example 5 | Example 6 | Example 7 | Example 8 |
|---|---|---|---|---|---|---|---|---|---|---|---|
| Composition | Monomer component[*1] (mass %) | A | A-1 | 12.5 | 33.2 | 26.9 | | | | | |
| | | | A-2 | | | | 26.9 | | | 26.9 | 26.9 |
| | | | A-3 | | | | | 26.9 | | | |
| | | | A-4 | | | | | | 26.9 | | |
| | | B | ETS | 32.4 | 11.7 | 18.0 | 18.0 | 18.0 | 18.0 | 18.0 | 18.0 |
| | | | SIGMA | | | | | | | | |
| | | C | HEMA | | | | | | | | 13.8 |
| | | | HPMA | | | | | | | 13.8 | |
| | | | HBMA | 13.8 | 13.6 | 13.8 | 13.8 | 13.8 | 13.8 | | |
| | | D | MAA | 0.9 | 0.9 | 0.9 | 0.9 | 0.9 | 0.9 | 0.9 | 0.9 |
| | | E | MPC | 9.0 | 9.0 | 9.0 | 9.0 | 9.0 | 9.0 | 9.0 | 9.0 |
| | | | NVP | 13.5 | 13.5 | 13.5 | 13.5 | 13.5 | 13.5 | 13.5 | 13.5 |
| | | | DMAA | | | | | | | | |
| | | | MMA | 17.9 | 17.9 | 17.9 | 17.9 | 17.9 | 17.9 | 17.9 | 17.9 |
| | Sum of monomers | | | 100.0 | 100.0 | 100.0 | 100.0 | 100.0 | 100.0 | 100.0 | 100.0 |
| | Other component[*2] (parts by mass | F | HeOH | 20.0 | 20.0 | 20.0 | 20.0 | 20.0 | 20.0 | 20.0 | 20.0 |
| | | Cross-linking agent | TEGDV | 0.8 | 0.8 | 0.8 | 0.8 | 0.8 | 0.8 | 0.8 | 0.8 |
| | | | TEGDMA | 0.8 | 0.8 | 0.8 | 0.8 | 0.8 | 0.8 | 0.8 | 0.8 |
| | | Initiator | AIBN | 0.5 | 0.5 | 0.5 | 0.5 | 0.5 | 0.5 | 0.5 | 0.5 |
| Polymerization condition | Step 1 | Temperature(° C.) | | | | | | | | | |
| | | Time (hour) | | | | | | | | | |
| | Step 2 | Temperature(° C.) | | 100 | 100 | 100 | 100 | 100 | 100 | 100 | 100 |
| | | Time (hour) | | 2 | 2 | 2 | 2 | 2 | 2 | 2 | 2 |
| Evaluation | Modulus of CL[*3] [MPa] | | | A (0.5) | B (0.8) | A (0.6) | A (0.4) | A (0.4) | B (0.3) | A (0.6) | B (0.7) |
| | Elongation at break of CL [%] | | | B (260) | B (210) | B (230) | B (270) | A (300) | A (330) | B (290) | A (330) |
| | Water content(stability) [%] | | | B (55→54) | B (39→38) | A (48→48) | A (50→50) | B (52→51) | B (55→54) | A (52→52) | A (54→54) |

*1 Blending amount of components A to E; with respect to a total amount of monomer components

*2 Blending amount of component F, cross-linking agent, initiator; with respect to a total 100 parts by mass of monomer components

*3 Contact lens

TABLE 3

| | | | | Example 9 | Example 10 | Example 11 | Example 12 | Example 13 | Example 14 | Example 15 | Example 16 |
|---|---|---|---|---|---|---|---|---|---|---|---|
| Composition | Monomer component*[1] (mass %) | A | A-3 | | | | | | | | |
| | | | A-2 | 26.9 | 26.9 | 26.9 | 26.9 | 26.9 | 26.9 | 26,9 | 26.9 |
| | | | A-3 | | | | | | | | |
| | | | A-4 | | | | | | | | |
| | | B | ETS | 18.0 | 18.0 | | 18.0 | 18.0 | 18.0 | 18.0 | 18.0 |
| | | | SIGMA | | | 18.0 | | | | | |
| | | C | HEMA | | | | | 6.9 | | | |
| | | | HPMA | | | | | | | | |
| | | | HBMA | 18.0 | 27.0 | 13.9 | 13.8 | 6.9 | 13.8 | 13.8 | 13.5 |
| | | D | MAA | 0.9 | 0.9 | 0.9 | 0.9 | 0.9 | 0.9 | 0.9 | 0.9 |
| | | E | MPC | 9.0 | 9.0 | 9.0 | 14.1 | 9.0 | 9.0 | 9.0 | 8.9 |
| | | | NVP | 13.5 | 10.3 | 13.5 | 8.4 | 13.5 | 13.5 | 13.5 | 13.3 |
| | | | DMAA | | | 8.9 | | | | | |
| | | | MMA | 13.7 | 7.9 | 8.9 | 17.9 | 17.9 | 17.9 | 17.9 | 17.6 |
| | Sum of the monomers | | | 100.0 | 100.0 | 100.0 | 100.0 | 100.0 | 100.0 | 100.0 | 99.1 |
| | Other component*[2] (parts by mass) | F | HeOH | 20.0 | 20.0 | 20.0 | 20.0 | 20.0 | 20.0 | 20.0 | 20.0 |
| | | Cross-linking agent | TEGDV | 0.8 | 0.8 | 0.8 | 0.8 | 0.8 | 1.6 | | 0.8 |
| | | | TEGDMA | 0.8 | 0.8 | 0.8 | 0.8 | 0.8 | | 1.6 | 0.8 |
| | | Initiator | AIBN | 0.5 | 0.5 | 0.5 | 0.5 | 0.5 | 0.5 | 0.5 | 0.5 |
| Polymerization condition | Step 1 | Temperature(° C.) | | | | | | | | | 55 |
| | | Time (hour) | | | | | | | | | 7 |
| | Step 2 | Temperature(° C.) | | 100 | 100 | 100 | 100 | 100 | 100 | 100 | 120 |
| | | Time (hour) | | 2 | 2 | 2 | 2 | 2 | 2 | 2 | 2 |
| Evaluation | Modulus of CL*[3] [MPa] | | | A (0.5) | B (0.8) | B (0.3) | A (0.4) | A (0.6) | B (0.8) | A (0.4) | A (0.6) |
| | Elongation at break of CL [%] | | | A (340) | A (360) | B (270) | B (270) | B (280) | B (240) | B (260) | B (290) |
| | Water content(stability) [%] | | | A (46→46) | A (43→43) | A (52→52) | B (57→56) | A (43→43) | B (47→46) | A (52→52) | A(53→53) |

*[1]Blending amount of components A to E; with respect to a total amount of monomer components

*[2]Blending amount of component F, cross-linking agent, initiator; with respect to a total 100 parts by mass of monomer components

*[3]Contact lens

TABLE 4

| | | | | Comparative Example 1 | Comparative Example 2 |
|---|---|---|---|---|---|
| Composition | Monomer component*[1] (mass %) | A | A-1 | 26.9 | 26.9 |
| | | | A-2 | | |
| | | | A-3 | | |
| | | | A-4 | | |
| | | B | ETS | 24.9 | 18.0 |
| | | | SIGMA | | |
| | | C | HEMA | | |
| | | | HPMA | | |
| | | | HBMA | | 33.8 |
| | | D | MAA | 0.9 | 0.9 |
| | | E | MPC | 9.0 | 8.5 |
| | | | NVP | 20.4 | 8.5 |
| | | | DMAA | | |
| | | | MMA | 17.9 | 3.4 |
| | Sum of the monomers | | | 100.0 | 100.0 |
| | Other component*[2] (parts by mass) | F | HeOH | 20.0 | 20.0 |
| | | Cross-linking agent | TEGDV | 0.8 | 0.8 |
| | | | TEGDMA | 0.8 | 0.8 |
| | | Initiator | AIBN | 0.5 | 0.5 |
| Polymerization condition | Step 1 | Temperature(°C) | | | |
| | | Time (hour) | | | |
| | Step 2 | Temperature(°C) | | 100 | 100 |
| | | Time (hour) | | 2 | 2 |
| Evaluation | Modulus of CL*[3][MPa] | | | B (0.3) | C (1.0) |
| | Elongation at break of CL [%] | | | C (180) | B (210) |
| | Water content(stability) [%] | | | B (55→54) | B (39→38) |

*[1]Blending amount of components A to E; with respect to a total amount of monomer components

*[2]Blending amount of component F, cross-linking agent, initiator; with respect to a total 100 parts by mass of monomer components

*[3]Contact lens

Accordingly, it was confirmed that the contact lens obtained by polymerizing the monomer composition for contact lens of the present invention can simultaneously satisfy modulus, elongation at break and stability.

INDUSTRIAL APPLICABILITY

A contact lens which simultaneously satisfy modulus, elongation at break and stability can be provided.

The invention claimed is:

1. A monomer composition comprising:

(A) a phosphorylcholine group-containing polysiloxane monomer represented by the following formula (1);

(B) a siloxanyl group-containing silicone monomer having at least one or more hydroxy groups in a molecule, represented by the following formula (2) or (3);

(C) one or more hydrophilic monomers selected from hydroxyethyl (meth)acrylate, hydroxypropyl (meth) acrylate, and hydroxybutyl (meth)acrylate;

(D) methacrylic acid; and (E) a hydrophilic monomer other than the component (C), wherein, with respect to a total 100 mass % of the components (A) to (E) in the composition, a content ratio of the component (A) is 10 to 45 mass %, a content ratio of the component (B) is 10 to 40 mass %, a content ratio of the component (C) is 10 to 30 mass %, a content ratio of the component (D) is 0.1 to 5 mass %, and a content ratio of the component (E) is 0 to 50 mass %, (1)

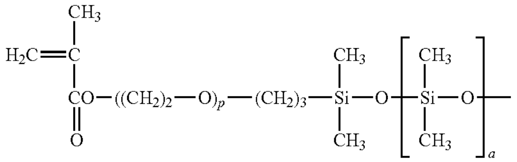

-continued

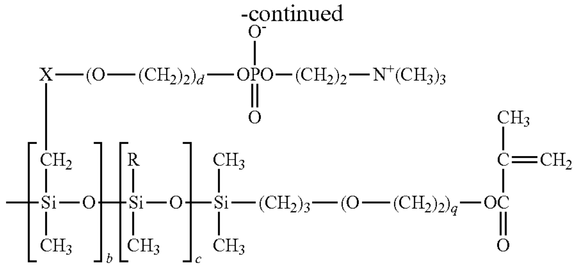

wherein, a represents an integer of 20 to 500; b represents an integer of 1 to 70; c represents an integer of 1 to 70; d represents 0 or 1; p and q each represent 0 or 1; X represents $-CH_2-$ or $-CH_2CH_2-$; and R represents an alkyl group having 2 to 18 carbon atoms, (2)

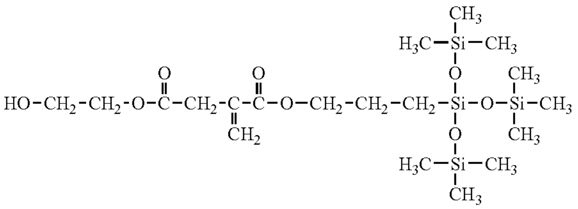

-continued (3)

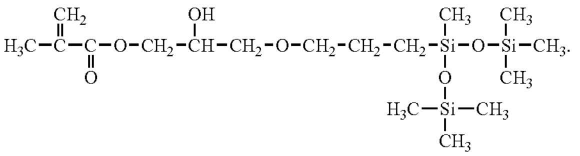

2. The monomer composition according to claim 1, further comprising (F) a solvent having a hydroxy group, wherein, with respect to a total 100 parts by mass of the components (A) to (E) in the composition, a content ratio of the component (F) is 30 parts by mass or less.

3. A polymer comprising a polymer of the monomer composition according to claim 1.

4. A contact lens comprising a hydrate of the polymer according to claim 3.

5. A method of producing a contact lens comprising:

mixing the polymer according to claim 3 with one or more solvents selected from water, methanol, ethanol, 1-propanol, and 2-propanol, and washing the polymer; and hydrating the polymer by immersing in physiological saline.

* * * * *